United States Patent [19]

Hartman

[11] Patent Number: 4,686,788
[45] Date of Patent: Aug. 18, 1987

[54] MINNOW BUCKET

[76] Inventor: Robert D. Hartman, 1000-74th Ave. North, Brooklyn Park, Minn. 55444

[21] Appl. No.: 925,074

[22] Filed: Oct. 30, 1986

[51] Int. Cl.⁴ .............................................. A01K 97/04
[52] U.S. Cl. .................................... 43/56; 206/315.11
[58] Field of Search .............. 220/244, 249, 263, 318; 206/315.11; 43/56, 54.1, 55

[56] References Cited

U.S. PATENT DOCUMENTS

| | | | |
|---|---|---|---|
| 2,111,959 | 3/1938 | Baxter | 43/56 |
| 2,149,996 | 3/1939 | Guldin | 43/56 |
| 3,000,132 | 9/1961 | Korstinen | 43/56 |
| 3,002,312 | 10/1961 | Barker | 43/56 |
| 3,009,281 | 11/1961 | Unger | 43/56 |
| 3,955,306 | 5/1976 | Handa | 43/56 |

Primary Examiner—Nicholas P. Godici
Assistant Examiner—Karen Skillman
Attorney, Agent, or Firm—Burd, Bartz & Gutenkauf

[57] ABSTRACT

A minnow bucket for containing live bait for fishing comprising a housing closed at both ends and having an access door in one upper side wall of the housing. The minnow bucket is characterized by having a lift plate or basket which may be raised above the normal water level in the bucket by means of an external handle to provide easy access to the bait without discomfort from placing the hand in cold water. The access opening is provided with a door which is linked to the same handle for automatic opening. Latch means are provided for holding the handle in raised position. Preferably the bucket is buoyant by the provision of at least one airtight chamber associated with the minnow bucket.

16 Claims, 9 Drawing Figures

U.S. Patent  Aug. 18, 1987  Sheet 1 of 3  4,686,788
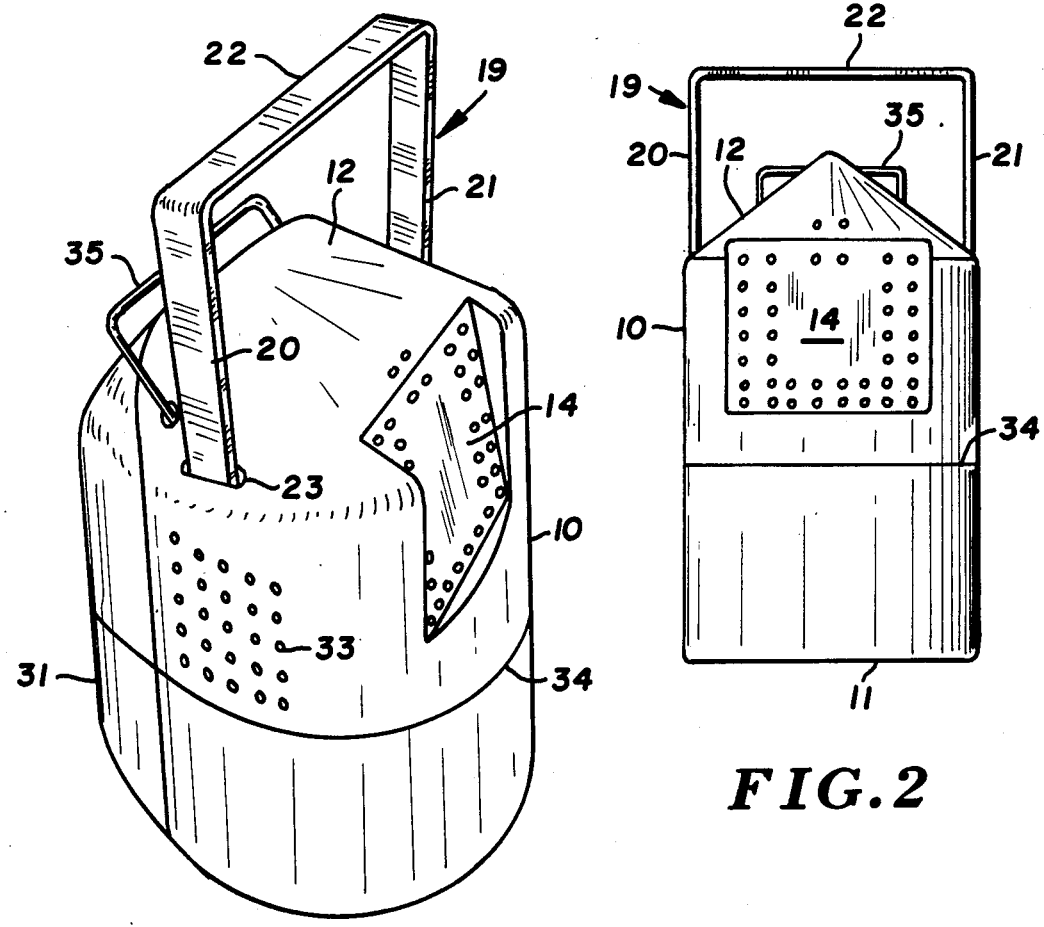
FIG.1
FIG.2
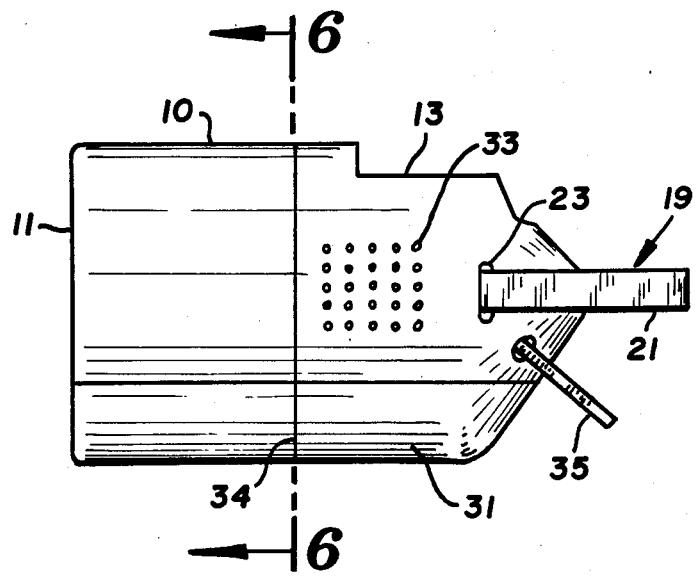
FIG.3
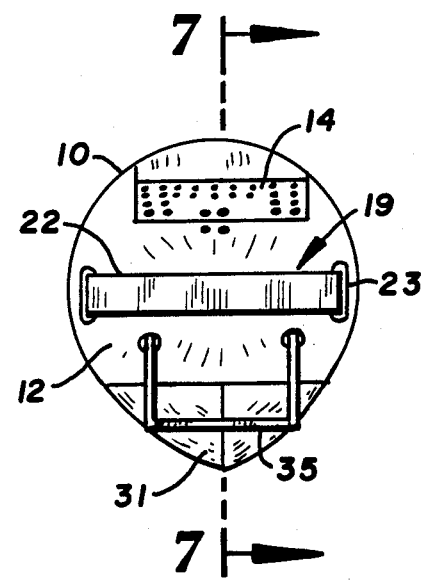
FIG.4

MINNOW BUCKET

BACKGROUND OF THE INVENTION

1. Field of the Invention

This invention relates to minnow buckets for carrying bait for fishing and provided with means for lifting the bait out of the water in the bucket for easy grasping by the fisher. More particularly, the invention relates to such a minnow bucket which can be manually carried and which also may be towed beside or behind a boat.

In order to keep them alive, minnows used as bait for fishing are carried in a bucket of water so that the minnows are maintained in an environment similar to that in nature. When using the available minnow buckets, the fisher must immerse a hand in the water of the minnow bucket and feel around under water until a minnow is encountered and grasped. This water is usually cold, and often frigid, such as during the early opening days of a fishing season. Immersing the hand into this cold water is uncomfortable and sometimes numbing to the fisher's hands, making retrieval of a minnow more difficult. The present invention is directed to an improved minnow bucket alleviating these inconveniences and discomfort. At the same time, an improved buoyant stucture is provided for towing the minnow bucket beside or behind a boat.

2. The Prior Art

Unger U.S. Pat. No. 3,009,281 discloses a minnow bucket having a substantially cylindrical casing, a pair of longitudinally positioned buoyant chambers positioned on either side of the casing, a spring loaded door for gaining access to the casing, and a weighted member for maintaining the attitude of the bucket in water with the access door in an upper position. The present invention represents a significant improvement over that of the Unger patent.

SUMMARY OF THE INVENTION

Broadly stated the present invention is directed to a minnow bucket comprising an elongated substantially cylindrical housing closed at both ends and having a door opening in one side. A generally circular reciprocable perforated lift plate is provided within the housing parallel to the bottom end wall of the housing. A handle is secured to the lift plate and extends through the top end wall of the housing. A door hinged along its top edge is provided on the inside of the door opening. Link means connect the door and the handle so that when the handle and lift plate are raised, the door automatically opens providing access to the bait on the lift plate raised out of the water. Latch means are provided for holding the handle and lift plate in raised position. Preferably the housing is also provided with at least one external buoyant chamber capable of maintaining the minnow bucket afloat when partially filled with water and bait. At the same time, weight means are provided to maintain the door side of the housing upright when the bucket is floating.

BRIEF DESCRIPTION OF THE DRAWINGS

The invention is illustrated by the accompanying drawings in which corresponding parts are identified by the same numerals and in which:

FIG. 1 is a perspective view of the preferred form of the invention from the door side;

FIG. 2 is a front elevation thereof;

FIG. 3 is a side elevation of the minnow bucket shown on its side or trolling position;

FIG. 4 is a top plan view of the minnow bucket;

FIG. 4 is a longitudinal section on the line 7—7 of FIG. 4 and in the direction of the arrows showing the door in closed position and the handle and lift plate in lower position;

DETAILED DESCRIPTION OF THE PREFERRED EMBODIMENT

Figure 5:
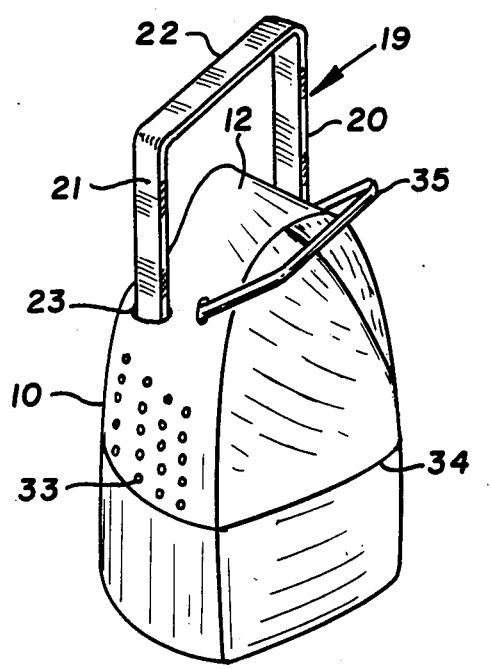
FIG. 5 is a perspective view of the preferred form of minnow bucket from the hull or buoyant chamber side.
Figure 6:
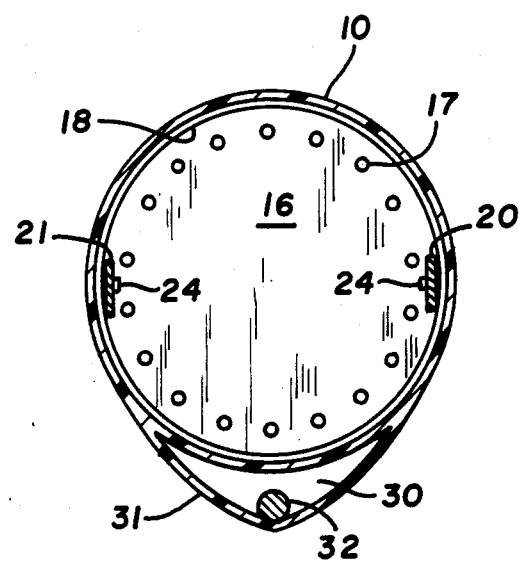
FIG. 6 is a transverse section on the line 6—6 of FIG. 7 and in the direction of the arrows.

The minnow bucket of this invention has two normal positions. The first is a generally vertical position, as when the bucket is being carried or is resting on some solid surface. The other is a generally horizontal configuration, as when the minnow bucket is floating or being towed. In describing the illustrated structure, such expressions as "top", "bottom", "side", shall for convenience refer to the positions when the minnow bucket is in its generally vertical configuration.

Referring now to the drawings, the minnow bucket according to the present invention comprises a generally cylindrical housing 10 having a flat bottom wall 11 and generally conical top wall 12. An access door opening 13 is provided in the side wall of housing 10 adjacent the upper end thereof. A perforated door 14 on the inside of the housing closes the door opening. Door 14 is secured over the opening 13 by means of a spring biased hinge 15 at the upper edge of the door and opening to normally urge the door into closed position.

A circular lift plate or basket 16 is positioned within the housing. Lift plate or basket 16 is disposed generally parallel to the housing bottom wall 11 and is of diameter slightly smaller than the inside of the housing to permit reciprocal movement with a loose slide fit. Plate or basket 16 is provided with a plurality of perforations 17 for drainage and preferably has an upstanding lip or flange 18 around its outer periphery.

Lift plate or basket 16 is reciprocated within the housing by means of a lift handle, indicated generally at 19. Handle 19 has a generally inverted U-shape configuration and includes leg portions 20 and 21 connected at one end by a hand grip portion 22. The leg portions of the lift handle extend through spaced apart openings 23 in the top wall of the housing with a loose slide fit. The free ends of the leg portions 20 and 21 are connected to the lift plate or basket 16 by attachment at 24 to the flange 18.

When handle 19 is raised, lift plate or basket 16 is also raised. This lifts the minnows in the bucket out of, or substantially out of, the water in the bottom of the bucket and permits selection of a minnow with maximum ease and minimum discomfort without the necessity of plunging the hand into the water. In order to hold the lift plate or basket 16 in its raised position, notches 25 are provided in the edges of handle leg portions 20 and 21. Notches 25 engage the edges of openings 23 in the housing top wall to retain the handle 19 and plate 16 each in its raised position. Preferably the notches 25 are on opposite sides of the handle leg portions. For example, referring to FIG. 7, notch 25 in leg portion 20 is on the upper edge thereof as seen in that Figure. The corresponding notch in leg 21 is on the opposite or bottom edge. Thus, when the handle 19 is lifted, a slight twisting motion causes engagement between the notches and housing openings.

Figure 7:
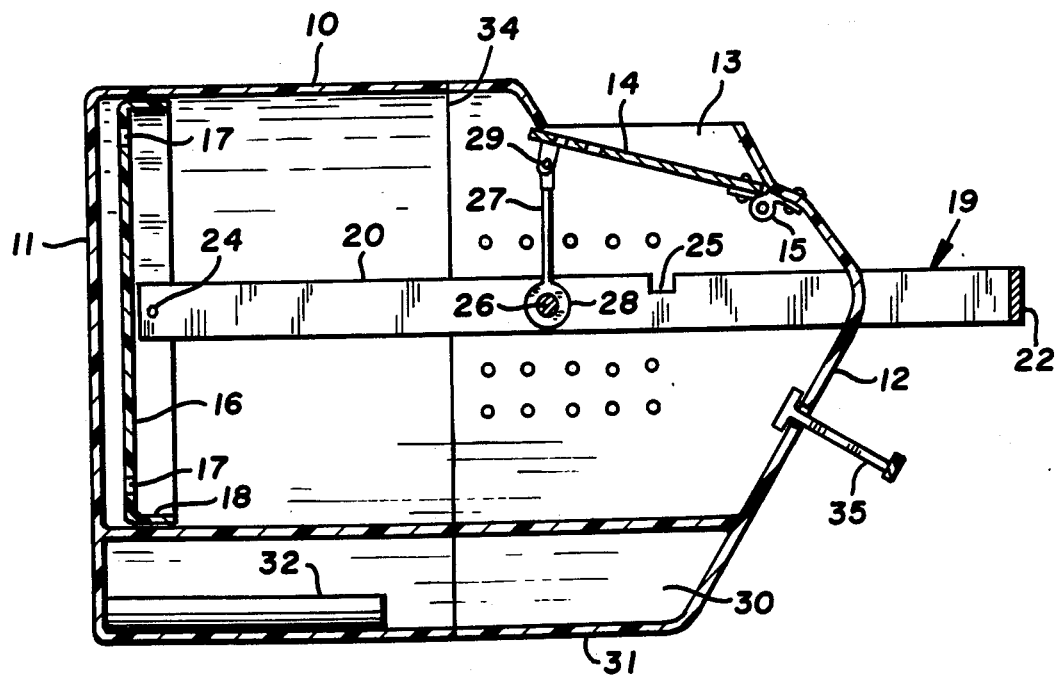
Figure 8:
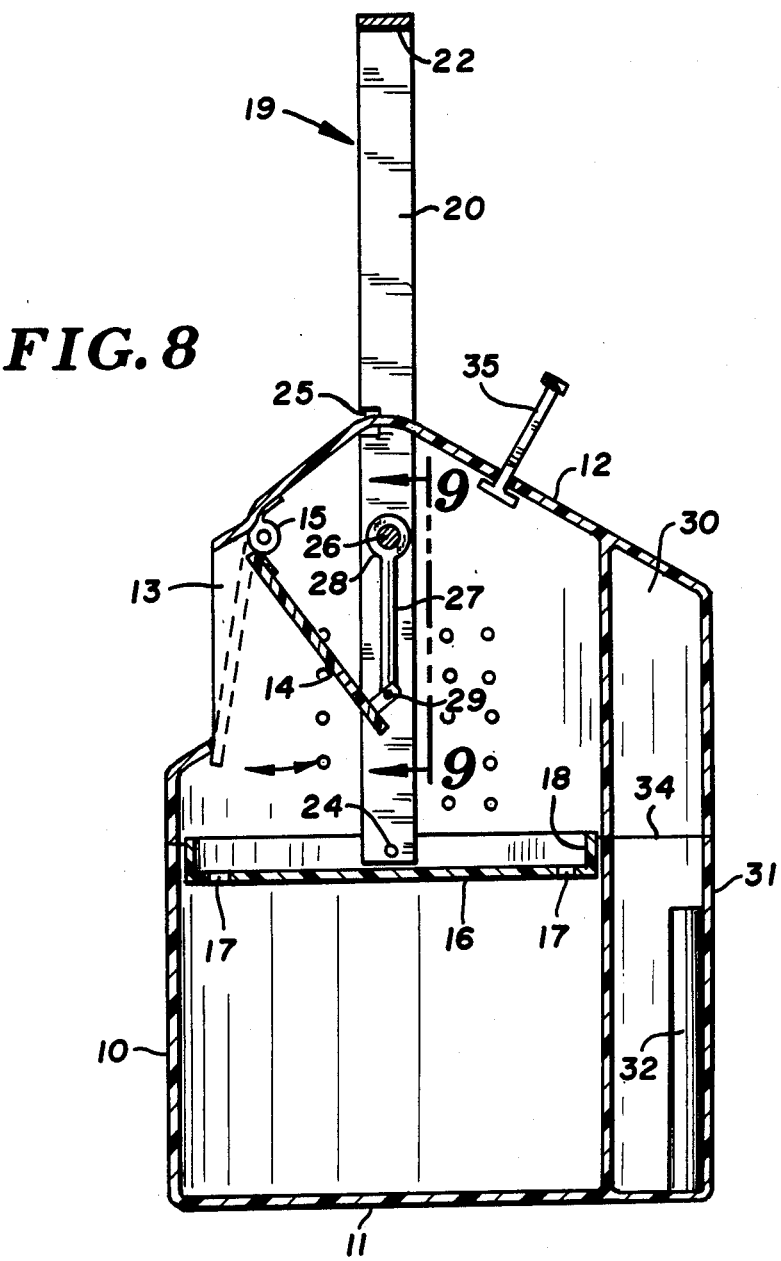
FIG. 8 is a similar longitudinal section showing the door in open position and the handle and lift plate in raised position.
Figure 9:
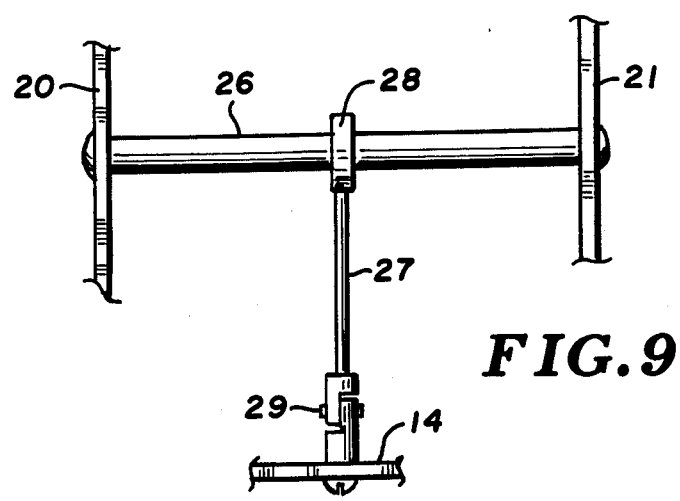
FIG. 9 is a fragmentary view on an enlarged scale showing one form of linkage means between the door and lift handle.

To permit ready access to the bait on the raised lift plate, door 14 is linked to lift handle 19 to open automatically and remain opened so long as the lift plate is in its raised position. One form of link means is shown in FIGS. 7-9. A cross bar 26 extends between the lift handle leg members. A rigid link 27 is provided at one end with a journal 28 which rotates relative to the cross bar 26. The opposite end of link 27 is connected adjacent the bottom edge portion of door 14 by means of a pivot joint 29. Thus, as seen in FIG. 8, when the lift handle and lift plate are raised and latched, door 14 is opened and remains open. So long as the door hinge 15 is spring biased in the closed position, a flexible link in the form of a chain or cable may be used to connect the door to the handle cross bar.

In order to make the minnow bucket buoyant for towing, the minnow bucket is provided with at least one buoyant member. A pair of buoyant members may be positioned on either side of the bucket as in the aforementioned Unger patent. Preferably, however, a single sealed air chamber 30 is provided which is enclosed within a V-hull housing 31 positioned external of the housing 10 on the side opposite from door opening 13. The hull housing is flat at its bottom or rearward end and tapers toward its upper or forward end, comparable to an ordinary rowboat or similar vessel. In order to maintain the door opening uppermost when the minnow bucket is afloat, a weight 32 is provided on the side of the bucket opposite from the door opening, preferably within the sealed air chamber, as shown. Preferably weight 32 is disposed toward the bottom or rearward end of the buoyant chamber so that the bucket when afloat rides with the door opening higher in the water. The weight member may be secured by any suitable means, such as adhesive, or friction clamps, or the like.

A plurality of perforations 33 are provided in the upper portion of housing 10 on opposite sides of the door opening. These perforations permit exchange of water within the minnow bucket when the bucket is being towed and drainage of excess water when the minnow bucket is placed upright.

The leg portions of the lifting handle 19 may be provided with additional notches spaced upwardly on the legs by the distance which the lift plate 16 may be raised. This is for the purpose of locking the lift plate in lowered position and permitting handle 19 to be used to carry the minnow bucket. However, since the lifting handle might accidentally become dislodged from its locked position while used as a carrying handle, it is preferred to provide a separate carrying handle 35 in the top wall of the housing.

Handle 35 may also be used to attach the end of a line for towing the minnow bucket, or simply tethering it to a pier or lake bank or the like.

For ease of construction and assembly, the housing and buoyant chamber are preferably formed integrally by molding from an appropriate synthetic resinous plastic material. The upper and lower portions of the composite buoyant bucket may be formed in relatively simple molds and the two parts joined together along a sealing seam 34.

For ease of assembly, parts which are joined are preferably made with snap-in fittings. For example, the ends of cross bar 26 may have projections which snap into appropriately sized openings in handle leg portions 20 and 21. Similarly, the flange 18 of lift plate 16 may be provided with projections which snap into holes in the handle leg portions to form fasteners 24.

It is apparent that many modifications and variations of this invention as hereinbefore set forth may be made without departing from the spirit and scope thereof. The specific embodiments described are given by way of example only, and the invention is limited only by the terms of the appended claims.

The embodiments of the invention in which an exclusive property or privilege is claimed are defined as follows:

1. A minnow bucket comprising:
   (A) an elongated substantially cylindrical housing closed at its opposite ends,
   (B) a door opening in one side of the housing,
   (C) a generally circular perforated lift plate within said housing parallel to the bottom end wall thereof,
   (D) a handle secured to said lift plate and extending through the top end wall of the housing,
   (E) a door on the inside of said door opening hinged along the top edge of the opening,
   (F) link means between said door and said handle whereby raising of the handle and lift plate opens the door, and
   (G) latch means for holding the handle in raised position.

2. A minnow bucket according to claim 1 wherein:
   (A) said handle comprises a pair of parallel spaced apart leg members and a connecting hand gripping member at their upper ends in inverted U-shape configuration,
   (B) spaced apart holes are provided in the tapered wall of the housing for close fitting passage of the handle legs therethrough, and
   (C) the lower ends of the handle legs are connected to opposite sides of the lift plate.

3. A minnow bucket according to claim 2 wherein said latch means for holding the handle in raised position comprises notches in the edges of the handle legs intermediate of the ends thereof, said notches being engageable with the housing top wall adjacent to the handle passage holes.

4. A minnow bucket according to claim 3 wherein said notch in one handle leg is disposed in one edge thereof and said notch in the other of said handle legs is in the opposite edge thereof.

5. A minnow bucket according to claim 2 wherein:
   (A) said handle is provided with a horizontal cross bar between the handle legs intermediate of their ends and within the housing,
   (B) a rigid link is pivotally connected at one end to said cross bar, and
   (C) said link is pivotally connected at its opposite end to the bottom edge portion of said door.

6. A minnow bucket according to claim 1 wherein:
   (A) said housing is provided with at least one external buoyant chamber capable of maintaining the minnow bucket afloat when partially filled with water and bait, and
   (B) weight means are provided opposite from said door opening to maintain the door side of the housing upright when floating.

7. A minnow bucket according to claim 6 wherein:
(A) said buoyant chamber is a single chamber provided with a V-hull configuration and disposed externally of the housing on the side opposite from the door opening, and
(B) said weight means is disposed within the buoyant chamber.

8. A minnow bucket according to claim 7 wherein said weight means is disposed in said buoyant chamber toward the bottom or rearward end thereof, whereby the top or forward end of the minnow bucket when floating rides high in the water.

9. A minnow bucket according to claim 7 wherein said housing and buoyant chamber are formed integrally of molded synthetic resinous plastic material.

10. A minnow bucket according to claim 1 wherein said bucket is provided with an auxiliary carrying handle secured in the top wall of the housing.

11. A buoyant minnow bucket comprising:
(A) an elongated substantially cylindrical housing closed at both ends and having a flat bottom wall and generally conical top wall,
(B) a door opening in one side of the housing toward the top end thereof,
(C) a generally circular perforated lift plate within said housing parallel to the bottom end wall,
(D) a handle secured to said lift plate and extending through a pair of spaced apart holes in the top end wall of the housing,
　(1) said handle comprising a pair of parallel spaced apart leg members and a connecting hand gripping member at their upper ends in inverted U-shape configuration,
　(2) said leg members extending through said spaced apart holes for close fitting reciprocal passage, and
　(3) the lower ends of the handle legs being connected to opposite sides of the lift plate,
(E) a perforated door on the inside of the door opening hinged along the top edge of the opening,
(F) link means between the door and the handle whereby raising of the handle and lift plate opens the door,
(G) latch means for holding the handle in raised position,
(H) a single buoyant chamber having a V-hull configuration disposed externally of the housing on the side opposite from the door opening, and
(I) weight means disposed in said buoyant chamber toward the bottom or rearward end thereof whereby the door side of the housing is maintained upright when the minnow bucket is floating and the top or forward end of the minnow bucket rides high in the water.

12. A minnow bucket according to claim 11 wherein said latch means for holding the handle in raised position comprises notches in the edges of the handle legs intermediate of the ends thereof, said notches being engageable with the housing top wall adjacent to the handle passage holes.

13. A minnow bucket according to claim 12 wherein said notch in one handle leg is disposed in one edge thereof and said notch in the other of said handle legs is in the opposite edge thereof.

14. A minnow bucket according to claim 11 wherein:
(A) said handle is provided with a horizontal cross bar between the handle legs intermediate of their ends and within the housing,
(B) a rigid link is pivotally connected at one end to said cross bar, and
(C) said link is pivotally connected at its opposite end to the bottom edge portion of said door.

15. A minnow bucket according to claim 11 wherein said housing and buoyant chamber are formed integrally of molded synthetic resinous plastic material.

16. A minnow bucket according to claim 11 wherein said bucket is provided with an auxiliary carrying handle secured in the top wall of the housing.

* * * * *

UNITED STATES PATENT AND TRADEMARK OFFICE
CERTIFICATE OF CORRECTION

PATENT NO. : 4,686,788

DATED : August 18, 1987

INVENTOR(S) : Robert D. Hartman

It is certified that error appears in the above-identified patent and that said Letters Patent is hereby corrected as shown below:

Column 2, line 7, "Fig. 7" should be --Fig. 3--.

Column 4, line 42, "ed" should be omitted.

Signed and Sealed this

Fifteenth Day of December, 1987

Attest:

DONALD J. QUIGG

Attesting Officer

Commissioner of Patents and Trademarks